United States Patent [19]
Nebbia

[11] 3,870,406
[45] Mar. 11, 1975

[54] MECHANISM FOR MOVING FILM INTO AND FROM ENGAGEMENT WITH SPROCKETS IN MOTION PICTURE PROJECTORS

[75] Inventor: Rodolfo Nebbia, Torino, Italy

[73] Assignee: Robert Bosch Photokino GmbH, Stuttgart, Germany

[22] Filed: Mar. 9, 1973

[21] Appl. No.: 339,944

[30] Foreign Application Priority Data
Mar. 15, 1972 Germany.......................... 2212422

[52] U.S. Cl. ............................. 352/159, 352/180
[51] Int. Cl. ............................................. G03b 1/56
[58] Field of Search ............ 352/157, 158, 159, 180

[56] References Cited
UNITED STATES PATENTS

| | | | |
|---|---|---|---|
| 1,282,437 | 10/1918 | Krug | 352/159 |
| 1,865,107 | 6/1932 | Howell | 352/159 |
| 1,973,477 | 9/1934 | Fritts | 352/157 |
| 2,983,416 | 5/1961 | Hanken | 352/158 X |
| 3,119,300 | 1/1964 | Barocela | 352/157 |
| 3,261,654 | 7/1966 | Faber | 352/180 |

Primary Examiner—Monroe H. Hayes
Attorney, Agent, or Firm—Michael S. Striker

[57] ABSTRACT

A motion picture projector wherein a sprocket is mounted downstream of the film gate to normally transport the film lengthwise toward the takeup reel. A portion of the film guide mechanism between the gate and the takeup reel is pivotable by a cam to thereby move the film into or from engagement with the sprocket. The pivotable portion of the film guide mechanism further carries an elastic loop former which can increase the size of the loop in response to disengagement of film from the sprocket. The cam further serves to change the speed of the pull-down and to change the direction of film transport.

5 Claims, 1 Drawing Figure

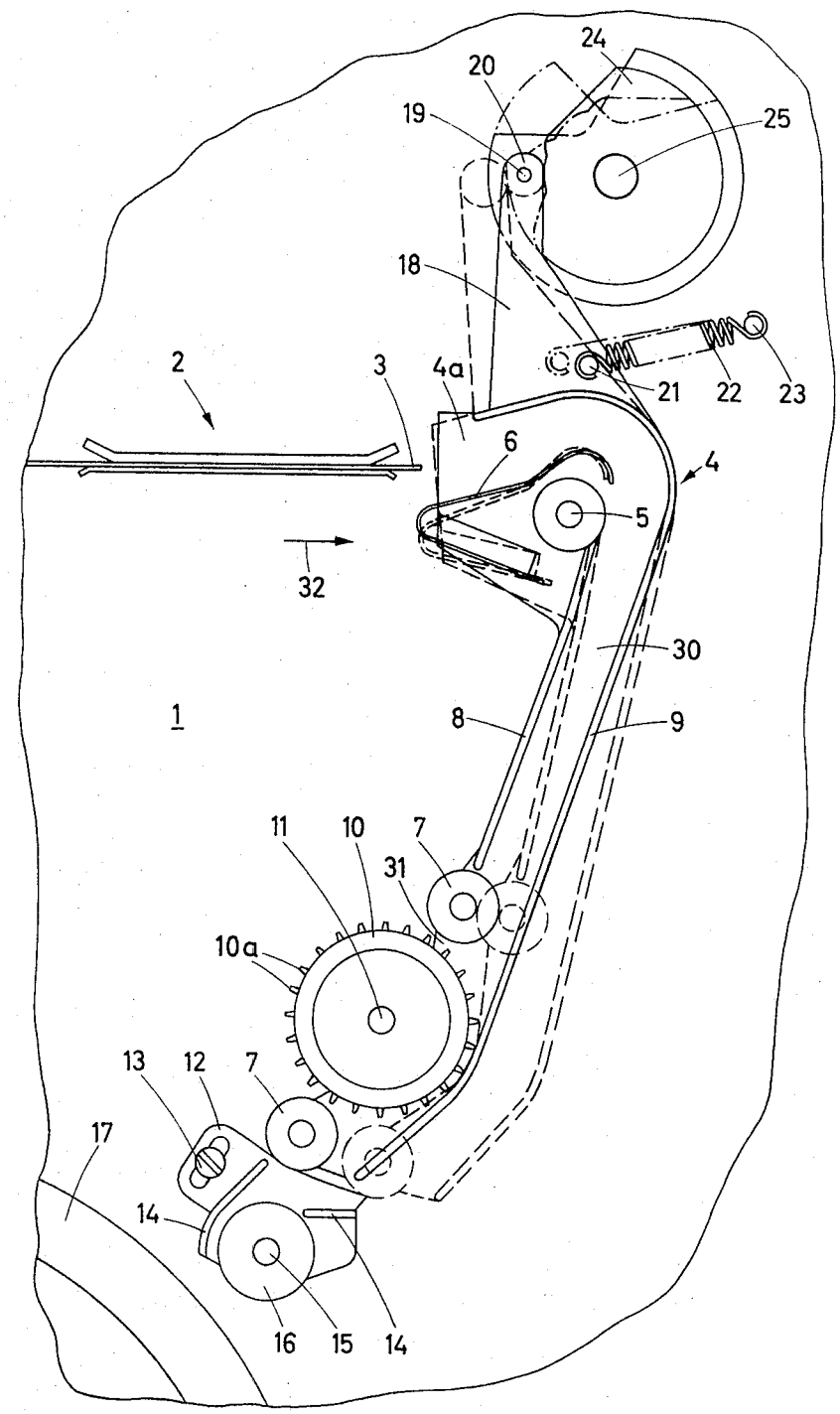

MECHANISM FOR MOVING FILM INTO AND FROM ENGAGEMENT WITH SPROCKETS IN MOTION PICTURE PROJECTORS

BACKGROUND OF THE INVENTION

The present invention relates to cinematographic apparatus in general, and more particularly to improvements in motion picture projectors. Still more particularly, the invention relates to improvements in mechanisms for guiding motion picture film between the supply and takeup reels in or on the housing of a motion picture projector.

It is known to provide a motion picture projector with elastic loop formers which are mounted upstream and downstream of the film gate (see the U.S. Pat. Nos. 2,273,855; 3,350,023; 3,402,007) and to further provide in the motion picture projector one or more sprockets including a sprocket which is installed between the film gate and the takeup reel to advance the film lengthwise in a direction toward the core of the takeup reel (see the U.S. Pat. Nos. 3,124,995; 3,165,251; 3,471,228). Such projectors are relatively simple and insure a satisfactory registry of film frames with the film gate. However, their versatility is not entirely satisfactory, mainly because the sprocket or sprockets are always in engagement with motion picture film and do not allow for transport of film at a desired number of frame frequencies per unit of time, for example, by resorting to a feeding mechanism which is shown in U.S. Pat. No. 3,402,007.

SUMMARY OF THE INVENTION

An object of the invention is to provide a cinematographic apparatus with novel and improved means for guiding and advancing motion picture film between the supply and takeup reels and with novel and improved means for establishing or terminating a driving connection between one or more selected film advancing devices and the film.

Another object of the invention is to provide a motion picture projector with novel and improved means for controlling the transport of motion picture film by means of one or more driven sprockets.

A further object of the invention is to provide a novel and improved mounting for the loop forming means of a cinematographic apparatus, especially for that portion of the loop forming means which is located between the film gate and the takeup reel.

An additional object of the invention is to provide novel and improved actuating means for selecting the direction and/or speed of film transport in a motion picture projector.

Still another object of the invention is to provide a motion picture projector with a novel and improved film guide mechanism which can embody, or serves as a substitute for, one or more loop formers.

A further object of the invention is to provide a motion picture projector with novel and improved means for looping motion picture film while the projector is in actual use.

The invention is embodied in a cinematographic apparatus, particularly in a motion picture projector, which comprises a housing, a reel (e.g., a takeup reel) which is rotatably supported by the housing, at least one sprocket or an analogous (preferably rotary) film advancing device which is supported by the housing and is operable to advance motion picture film lengthwise along a predetermined film path one end of which is adjacent to the reel, and shifting means which is actuatable (e.g., by a rotary cam which is mounted in or on the housing and can further control a master switch and/or other components of the apparatus analogous to those shown in U.S. Pat. No. 3,481,662) to establish or terminate a driving connection between the advancing device and motion picture film in the aforementioned film path. This can be achieved by using the shifting means to move the advancing device relative to the film path and/or to move a section of the film path between a first position in which the film in such section is engaged and transported by the advancing device and a second position in which the film in the section of the film path is free to bypass the advancing device.

The shifting means may form part of a film guide mechanism which further includes a customary film gate and one or more loop formers. The shifting means is preferably mounted between the film gate and the takeup reel and preferably supports or embodies an elastic loop former which loops the film against the pull which is exerted by the rotating reel when the shifting means is actuated to disengage the film from the advancing device.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is an enlarged fragmentary vertical sectional view of a motion picture projector which embodies one form of the invention and wherein the shifting means is pivotable between a first position in which the film is engaged by a driven sprocket and a second position in which the film is free to bypass the sprocket on its way toward or from the takeup reel.

DESCRIPTION OF THE PREFERRED EMBODIMENTS

The illustrated portion of the motion picture projector comprises a housing 1 which supports a spindle (not shown) for a rotary takeup reel 17. The housing 1 further supports a film advancing device here shown as a rotary sprocket 10 which can be operated (driven) by a shaft 11 receiving motion from the prime mover, not shown. The sprocket 10 is mounted in the housing 1 close to and upstream of the takeup reel 17, as considered in the direction of film transport from the supply reel (not shown) toward the takeup reel. The direction in which the motion picture film 3 must advance toward the core of the takeup reel 17 is indicated by an arrow 32.

Still further, the housing 1 supports novel and improved guide means which serves to define an elongated film path wherein the film 3 can be advanced in and counter to the direction indicated by the arrow 32. The guide means includes a customary film gate 2 which is located behind the projection lens (not shown) and in front of a conventional illuminating system of any known design. Furthermore, the guide means includes a portion 4 which constitutes a shifting device for motion picture film 3 and can turn about the axis of a pivot member 5 mounted in or on the housing 1. The shifting device 4 comprises a substantially plate-like carrier 4a having elongated guide elements or rails 8 and 9 which flank an elongated channel 30 constituting a section of the path wherein the motion picture film 3 can move between the supply reel and the takeup reel 17.

The carrier 4a supports two idler rolls 7 which flank an opening 31 in the rail 8 and are respectively located upstream and downstream of the sprocket 10. When the shifting device 4 is caused to assume a first position (shown by solid lines), the path section or channel 30 also assumes a first position in which the film between the rails 8, 9 is compelled (by rail 9) to move into the range of teeth 10a on the sprocket wheel 10 so that the latter can advance the film lengthwise in or counter to the direction indicated by the arrow 32, depending on the direction of rotation of the drive shaft 11. When the shifting device 4 is caused to assume a second position (shown by broken lines), the channel 30 also assumes a second position in which the film therein can bypass the teeth 10a of the sprocket 10 so that the film can be moved independently of the sprocket or can be brought to a standstill while the sprocket rotates. The idler rolls 7 automatically disengage the film from the sprocket 10 in response to pivoting of the shifting device 4 from the solid-line to the broken-line position.

The guide means further comprises a stationary film guide unit 12 which is adjustably secured to the housing 1 by one or more screws 13 or analogous fasteners and includes an idler roll 16 rotatable on a shaft 15 and two elongated platelike guide elements 14 which cause the film 3 to advance therebetween and into the space between the flanges of the takeup reel 17 (when the film 3 is advanced in the direction indicated by arrow 32). Inversely, the guide unit 12 will guide successive increments of the film 3 into the channel 30 when the film is caused to travel from the takeup reel 17 toward the supply reel.

The shifting device 4 further supports an elastic loop former 6 (e.g., a suitably configured leaf spring) which is mounted on the carrier 4a in the region of the pivot member 5 and deflects the leader of film 3 toward the concave internal surface of the adjacent portion of the rail 9 during threading of film into the channel 30.

Still further, the shifting device 4 is provided with follower means including an arm 18, a shaft 19 at the upper end of the arm 18, and a roller 20 which is rotatable on the shaft 19 and tracks the face of a cam 24 constituting or forming part of actuating means for the shifting device 4 and being rotatable on or with a shaft 25 which is mounted in or on the housing 1. The means for permanently biasing the roller 20 against the face of the cam 24 includes a helical spring 22 one end of which is attached to a post 21 on the arm 18 and the other end of which is attached to a post 23 in the housing 1. The spring 22 tends to pivot the carrier 4a in a clockwise direction, i.e., toward the first position which is indicated by solid lines. The shaft 25 can form part of or serves to actuate a master switch (not shown) of the motion picture projector. When the cam 24 is rotated to the angular position which is indicated by phantom lines, the shifting device 4 assumes the broken-line second position and the projector is then ready for rapid rewinding of film onto the supply reel or for presentation of images of successive frames while the film 3 is disengaged from the sprocket 10. Also, the loop former 6 automatically loops the film 3 in response to pivoting of the shifting device 4 to the broken-line second position.

The operation is as follows:

In order to thread the leader of film 3 through the guide means so that the leader can be attached to the core of the takeup reel 17, the operator moves the actuating cam 24 to the solid-line position so that the shifting device 4 also assumes its solid-line first position. The leader of film 3 is advanced in a manner not forming part of the present invention so that it moves through and beyond the film gate 2, into the open inlet of the channel 30, around the loop former 6, against the concave inner side of the rail 9 and into the range of teeth 10a on the sprocket 10 which is assumed to be driven in clockwise direction, as viewed in the drawing, whereby the sprocket advances the leader through the guide unit 12 and toward the core of the takeup reel 17. The loop former 6 automatically loops the film 3 immediately downstream of the film gate 2 and the size of the loop is sufficient to compensate for the fact that the sprocket 10 advances continuously whereas the customary pull-down in intermittent (not shown) advances the film in stepwise fashion. The pull-down insures that the film 3 moves stepwise in the region of the film gate 2.

If the pull-down "misses" one or more perforations of the film 3, the continuously driven sprocket 10 tensions the film between the film gate 2 and the opening 31 of the rail 8 so that the thus tensioned film deforms the loop former 6. This normally generates undesirable noise and the pull-down is less likely to place successive frames of film 3 into exact register with the film gate 2. In order to reduce the tension of film in the channel 30, the operator simply rotates the actuating cam 24 to the phantom-line position to thereby move the shifting device 4 to the broken-line second position and to thus disengage the film 3 from the teeth 10a of the sprocket 10 under the action of the idler rolls 7 on the carrier 4a. Since the sprocket 10 does not advance the film, the loop former 6 is free to expand and to enlarge the loop in the upper portion of the channel 30. The operator thereupon returns the actuating cam 24 to the solid-line position and the spring 22 automatically returns the shifting device 4 to the first position which is shown by solid lines. The teeth 10a of the sprocket 10 reengage the film and the projection of images continues without any noise because the loop former 6 is not stressed.

If the user wishes to shift to slow-motion operation, i.e., to advance the film 3 only by the pull-down at a relatively low speed, the actuating cam 24 is again moved to a position in which the film can bypass the teeth 10a of the sprocket 10 and is moved forwardly only by the pull-down which is then operated at a desired lower speed. The actuating cam 24 preferably controls the speed of the pull-down and can be moved to several positions in each of which the shifting device 4 assumes the broken-line second position. In one such position of the cam 24, the speed of the pull-down remains unchanged to advance the film at normal speed while the loop former 6 increases the length of the loop in the upper portion of the channel 30 in order to reduce or eliminate noise which is due to excessive deformation of the loop former. In another of its positions, the cam 24 again moves the shifting device 4 to the broken-line second position but simultaneously causes the pull-down to transport the film at a slower rate. The loop former 6 then compensates for the fact that the pull-down transports the film intermittently whereas the takeup reel 17 rotates at a constant speed.

If the operator wishes to rapidly rewind the film 3 onto the supply reel, the actuating cam 24 is moved to a third position in which it again causes the shifting device 4 to disengage the film from the sprocket 10 but simultaneously starts the drive for the supply reel so that the film 3 is rapidly transported counter to the direction indicated by arrow 32 and travels from the takeup reel 17 toward the supply reel. The film 3 is then guided by the idler rolls 16, 7, 7 and by the loop former 6.

Though extremely simple and compact, the loop former 6 is capable of increasing the size of the loop downstream of the film gate 2 as soon as the film 3 is disengaged from the sprocket 10. If desired, this loop former can be replaced by an integral part of the carrier 4a or it can be mounted adjacent to the carrier 4a so that is need not share the pivotal movements of the carrier. In some instances, the loop former 6 can be omitted altogether because the size of the loop increases automatically if the speed of the pull-down is increased while the film is disengaged from the sprocket 10 and the speed of the takeup reel 17 remains constant.

The improved cinematographic apparatus is susceptible of many additional modifications without departing from the spirit of the invention. As mentioned before, the shifting device 4 can be replaced by a device which moves the sprocket 10 into and from driving engagement with the film 3. Also, the shifting device 4 can be used together with a second shifting device which moves the sprocket 10 while the device 4 moves the film. Still further, the actuating cam 24 can be replaced with or used together with additonal actuating elements for the shifting device. For example, the cam 24 can be used to move the shifting device between the solid-line and broken-line positions in order to increase the size of the loop in the upper portion of the channel 30 when the pull-down misses one or more perforations of the film. A second actuating element can be used to move the shifting device 4 to the broken-line position and to simultaneously change the speed of the pull-down if the film is to be transported in slow motion or at several different speeds while the speed of the rotary shutter (not shown) remains unchanged (analogous to the device shown in U.S. Pat. No. 3,403,007). A third actuating element can be used to move the shifting device 4 to the borken-line position and to simultaneously start a drive for the supply reel for rapid rewinding of motion picture film.

it is further within the purview of the invention to employ two or more sprockets and to provide the apparatus with shifting means which can move the film into and from engagement with all of the sprockets, or vice versa.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture projector, a combination comprising a housing; a reel rotatably supported by said housing; at least one film advancing device supported by said housing and operable to advance motion picture film lengthwise along a predetermined path one end of which is adjacent to said reel; a film gate remote from said reel and arranged to guide the film along a portion of said path; elastic loop former means adjacent to said path between said gate and said advancing device; shifting means actuatable to establish or terminate a driving connection between said advancing device and the film, said shifting means including film guide means pivotable between first and second positions in which said advancing device respectively drives and is disengaged from the film, said film guide means defining an elongated channel for the film and having an opening through which said advancing device extends into said channel at least in the first position of said film guide means; means for pivotably supporting said film guide means in the region of said loop former means; and actuating means for moving said film guide means with respect to said advancing device.

2. A combination as defined in claim 1, wherein said film advancing device is a rotary sprocket.

3. A combination as defined in claim 1, wherein said loop former means is mounted on said shifting means.

4. A combination as defined in claim 1, wherein said shifting means has follower means and said actuating means includes a cam which is tracked by said follower means.

5. In a motion picture projector, a combination comprising a housing; a reel rotatably supported by said housing; at least one film advancing device supported by said housing and operable to advance motion picture film lengthwise along a predetermined path one end of which is adjacent to said reel; a film gate remote from said reel and arranged to guide the film along a portion of said path; elastic loop former means adjacent to said path between said gate and said advancing device; shifting means actuatable to establish and terminate a driving connection between said advancing device and the film, said shifting means comprising film guide means movable between first and second positions in which said advancing device respectively drives and is disengaged from the film, said film guide means defining a channel for motion picture film and having an opening through which said advancing device extends into said channel at least in the first position of said film guide means, said shifting means further comprising two rollers rotatably mounted in said film guide means and flanking said opening, said rollers being arranged to disengage the film in said channel from said advancing device in response to movement of said film guide means to said second position; and actuating means for moving said film guide means with respect to said advancing device.

* * * * *